United States Patent
Kondapalli et al.

(10) Patent No.: US 11,693,201 B2
(45) Date of Patent: Jul. 4, 2023

(54) INTERMITTENTLY BONDED OPTICAL FIBRE RIBBON WITH UNEQUAL BOND AND GAP LENGTHS

(71) Applicant: Sterlite Technologies Limited, Gurgaon (IN)

(72) Inventors: Hemanth Kondapalli, Gurgaon (IN); Swapnil Sharma, Gurgaon (IN); Sharun Kuhar, Gurgaon (IN); Aparna Nath, Gurgaon (IN); Vikash Shukla, Gurgaon (IN); Bhaskar Sarkaar, Gurgaon (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/139,508

(22) Filed: Dec. 31, 2020

(65) Prior Publication Data

US 2021/0271039 A1    Sep. 2, 2021

(30) Foreign Application Priority Data

Feb. 27, 2020    (IN) .............................. 202011008310

(51) Int. Cl.
*G02B 6/44*    (2006.01)

(52) U.S. Cl.
CPC .......... *G02B 6/4403* (2013.01); *G02B 6/4494* (2013.01)

(58) Field of Classification Search
CPC ............................ G02B 6/4403; G02B 6/4494
USPC .......................................................... 385/114
See application file for complete search history.

(56) References Cited

U.S. PATENT DOCUMENTS

| | | | | |
|---|---|---|---|---|
| 2015/0234139 A1* | 8/2015 | Cignarale | ............ | G02B 6/4403 385/114 |
| 2017/0219790 A1* | 8/2017 | Debban | ................... | G02B 6/448 |
| 2017/0299829 A1* | 10/2017 | Hoshino | ............... | G02B 6/4411 |
| 2018/0074261 A1* | 3/2018 | Burek | .................. | G02B 6/4403 |

* cited by examiner

*Primary Examiner* — Jerry M Blevins
(74) *Attorney, Agent, or Firm* — Steven R. Fairchild; Michael J. Pennnington

(57) ABSTRACT

The present disclosure provides an intermittently bonded optical fibre ribbon. The intermittently bonded optical fibre ribbon includes a plurality of optical fibres. The plurality of optical fibres are bonded intermittently along the length by a plurality of bonded portions spaced apart by a plurality of un-bonded portions. The plurality of bonded portions is defined by a bonded length $L_i$ and the plurality of un-bonded portions is defined by an un-bonded length. In addition, at least one of the bonded length $L_i$ and the un-bonded length varies along a predefined length of adjacent optical fibres of the plurality of optical fibres.

16 Claims, 5 Drawing Sheets

100

INTERMITTENTLY BONDED OPTICAL FIBRE RIBBON WITH UNEQUAL BOND AND GAP LENGTHS

CROSS-REFERENCE TO RELATED APPLICATIONS

The present application is based on, and claims priority from an Indian Application Number 202011008310 filed on 27 Feb. 2020, the disclosure of which is hereby incorporated by reference herein.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of an optical fibre communication technology and, in particular, relates to an intermittently bonded optical fibre ribbon with unequal bond and gap lengths.

Description of Prior Art

With the evolution of 5G and increase of data consumption in the recent years, application of data centres and Telecoms have increased drastically. In addition, large scale data centers and Telecom sectors require ultra-high fibre density cables that offers high data rate with low latency. The high fibre density cables include a large number of optical fibres inside cable. The optical fibres may be in the form of optical fibre ribbons or loose fibres. Traditionally, the structure of the optical fibre cables includes buffer tube, buffer tube sheath, and optical fibre ribbons or loose fibres. The buffer tube and sheath protects the optical fibres from physical damage. Conventionally, poor packing efficiency of the optical fibre ribbons leads to the increase of cable diameter in the high fibre count cables. In addition, a higher diameter cables lead to difficulty in handling, transport, installation and increase in cost. Further, conventional high fibre count cables are inefficient at junction points and manhole installation. Furthermore, the optical fibre ribbons of the conventional high fibre count cables collapse when load or force is applied at centre of the optical fibre ribbons. Moreover, linear scaling to achieve high fibre count in conventional high fibre count cables manufacturing is impractical.

In light of the above stated discussion, there is a need for an efficient and effective optical fibre cable that overcomes the above stated disadvantages.

BRIEF SUMMARY OF THE INVENTION

In an aspect, the present disclosure provides an intermittently bonded optical fibre ribbon. The intermittently bonded optical fibre ribbon includes a plurality of optical fibres. The plurality of optical fibres are bonded intermittently along a length by a plurality of bonded portions spaced apart by a plurality of un-bonded portions. The plurality of bonded portions is defined by a bonded length $L_i$ and the plurality of un-bonded portions is defined by an un-bonded length. In addition, at least one of the bonded length $L_i$ and the un-bonded length varies along a predefined length of adjacent optical fibres of the plurality of optical fibres.

The bonded length $L_i$ may vary in range of 2 millimeters to 40 millimeters.

The un-bonded length may have a shortest distance $SO_i$, within the predefined length. In addition, the shortest distance $SD_i$, may vary in range of 2 millimeters to 25 millimeters.

The un-bonded length may have a longest distance $LD_i$ within the predefined length. In addition, the longest distance $LD_i$ may vary in range of 5 millimeters to 180 millimeters.

The predefined length corresponds to a repeatable bonding pattern. In addition, the repeatable bonding pattern may repeat along the adjacent optical fibres groups of the plurality of optical fibres.

The predefined length in different groups of the plurality of groups may shift with a specific distance in longitudinal direction of the intermittently bonded optical fibre ribbon.

The plurality of optical fibres may have a diameter in range of 160 micrometers to 250 micrometers.

The plurality of optical fibres may have a pitch in range of 160 micrometers to 250 micrometers.

The bonded length $L_i$ and the un-bonded length between consecutive fibre pair of the plurality of optical fibres are different and form the repeatable bonding pattern.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
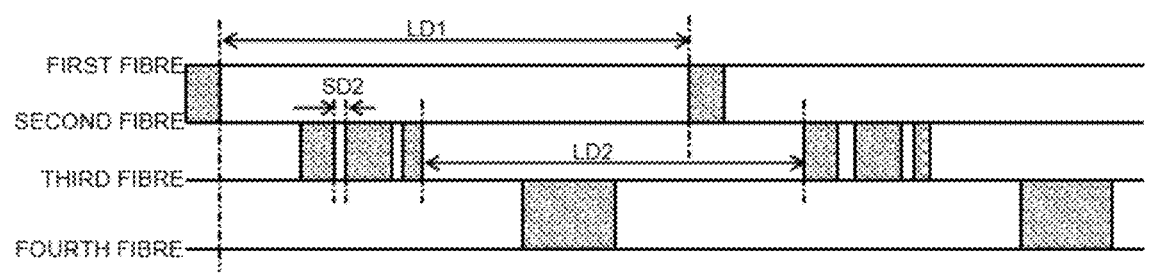
FIG. 1 illustrates a top view of an intermittently bonded optical fibre ribbon.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Intermittently bonded optical fibre ribbon.
200. Exemplary intermittently bonded optical fibre ribbon.
202. The first fibre.

204. The second fibre.
206. The third fibre.
208. The fourth fibre.
210. The fifth fibre.
212. The sixth fibre.
214. The seventh fibre.
216. The eighth fibre.
218. The ninth fibre.
220. The tenth fibre.
222. The eleventh fibre.
224. The twelfth fibre.
400. The optical fibre cable.
402. Plurality of bundles.
404. Water blocking tape.
406. Sheath.
408. Plurality of strength members.
410. Plurality of ripcords.
412. Plurality of water swellable yarns.
500. Example.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

According to FIG. 1, this is a top view of an intermittently bonded optical fibre ribbon 100. The intermittently bonded optical fibre ribbon 100 may be placed inside a buffer tube of an optical fibre cable. The intermittently bonded optical fibre ribbon 100 includes a plurality of optical fibres. In general, optical fibre ribbon includes one of the number of optical fibres secured or embedded substantially parallel to one another within coating material or the number of optical fibres bonded intermittently having plurality of bonded and un-bonded sections. In addition, optical fibre ribbons are embedded inside optical fibre cables that require high fibre counts within less installation space. In general, optical fibre cables are used to transfer digital data signals in form of light up to distances of hundreds of miles with higher throughput rates than those achievable via electrical communication cables. In general, optical fibre refers to medium associated with transmission of information over long distances in form of light pulses. In addition, the optical fibre uses light to transmit voice and data communications over long distances.

In addition, each of the plurality of optical fibres may have a diameter in range of about 160 micrometers to 250 micrometers. The diameter of each of the plurality of optical fibres may vary. The plurality of optical fibres may have a pitch in range of about 160 micrometers to 250 micrometers. The pitch of the plurality of optical fibres may vary. In general, pitch is distance between centers of two adjacent optical fibres.

The intermittently bonded optical fibre ribbon 100 is manufactured to achieve high fibre density and high packing efficiency. The intermittently bonded optical fibre ribbon 100 is manufactured by varying bond lengths between the plurality of optical fibres and varying distances between bonds.

The intermittently bonded optical fibre ribbon 100 includes a plurality of bonds. In addition, the plurality of bonds is made of matrix material. The plurality of bonds is used to bind the plurality of optical fibres. Further, each of the plurality of bonds has rectangular shape. Furthermore, each of the plurality of bonds has convex shape. Moreover, each of the plurality of bonds has concave shape. Also, each of the plurality of bonds has oval shape. Also, each of the plurality of bonds may have any suitable shape of the like.

The intermittently bonded optical fibre ribbon 100 includes the plurality of optical fibres and the plurality of bonds. In addition, the plurality of optical fibres are bonded intermittently along a length by a plurality of bonded portions spaced apart by a plurality of un-bonded portions. Further, the plurality of bonded portions and the plurality of un-bonded portions have different lengths between the plurality of optical fibres. The plurality of optical fibres in the intermittently bonded optical fibre ribbon 100 is divided into a plurality of groups. The plurality of groups has a repeatable bonding pattern between each of the plurality of optical fibres. The repeatable bonding pattern is repeated between each of the plurality of optical fibres in each group of the plurality of groups. In addition, number of the plurality of groups of the plurality of optical fibres in the intermittently bonded optical fibre ribbon 100 is 3. Further, number of the plurality of groups of the plurality of optical fibres in the intermittently bonded optical fibre ribbon 100 may vary.

Furthermore, the plurality of optical fibres in the intermittently bonded optical fibre ribbon 100 is considered as a single group. The plurality of bonds is placed in the repeatable bonding pattern of each of the plurality of groups of the plurality of optical fibres.

In an example, each group of the plurality of groups has 4 optical fibres with the repeatable bonding pattern. The plurality of optical fibres in each group of the plurality of groups includes a first fibre, a second fibre, a third fibre and a fourth fibre. In addition, length of the plurality of bonded portions and the plurality of un-bonded portions between the first fibre and the second fibre is different from length of the plurality of bonded portions and the plurality of un-bonded portions between the third fibre and the fourth fibre. Further, length of the plurality of bonded portions and the plurality of un-bonded portions between the first fibre and the second fibre and length of the plurality of bonded portions and the plurality of un-bonded portions between the third fibre and the fourth fibre is same. Furthermore, the repeatable bonding pattern for each group of the plurality of groups of the plurality of optical fibres is different. Moreover, the repeatable bonding pattern for each group of the plurality of groups of the plurality of optical fibres is same. Also, the repeatable bonding pattern in the intermittently bonded optical fibre ribbon 100 is periodic in nature.

The repeatable bonding pattern between the plurality of optical fibres (the first fibre, the second fibre, the third fibre, and the fourth fibre) as shown in FIG. 1 are repeated in each group of 4 optical fibres along the length and the width of the intermittently bonded optical fibre ribbon 100. The repeatable bonding pattern between the plurality of optical fibres (the first fibre, the second fibre, the third fibre, and the fourth fibre) as shown in FIG. 1 are repeated in each group of the plurality of groups along the length but not along the width of the intermittently bonded optical fibre ribbon 100. The repeatable bonding pattern in different groups of the plurality of groups is offset with respect to an adjacent group with a specific distance in longitudinal direction of the intermittently bonded optical fibre ribbon 100.

The plurality of bonded portions is defined by a bonded length $L_i$ and the plurality of un-bonded portions is defined by an un-bonded length. In addition, at least one of the bonded length $L_i$ and the un-bonded length varies along a predefined length of adjacent optical fibres of the plurality of optical fibres. The bonded length $L_i$ may vary in range of 2 millimeters to 40 millimeters. The range of the bonded length $L_i$ of each of the plurality of bonds may vary. In an example, distance between two consecutive bonds of the plurality of bonds varies in accordance with variation in distance between the plurality of optical fibres. Further, the plurality of bonds between the plurality of optical fibres is characterized by a shortest distance $SD_i$ and a longest distance $LD_i$. Furthermore, the shortest distance $SD_i$ is the shortest distance between two consecutive bonds that are located on the same fibre. Moreover, the longest distance $LD_i$ is longest distance between two bonds of the plurality of bonds between two adjacent optical fibres. The shortest distance $SD_i$ may vary within the predefined length in range of 2 millimeters to 25 millimeters. The shortest distance $SD_i$ may have any suitable range. The longest distance $LD_i$ may vary in range of 5 millimeters to 180 millimeters. The range of the longest distance $LD_i$ may vary.

$L_i$=Length of bond: 2 mm≤L≤40 mm
$SD_i$=Shortest distance between two consecutive bonds that are located on the same fibre: 2 mm≤$SD_i$≤25 mm
$LD_i$=Longest distance between two consecutive bonds on the same fibre:
5 mm≤$LD_i$≤180 mm.

In form of described function, the shortest and the longest distance between consecutive bonds in a particular consecutive fibre pair can be written as:

$$[l_{1j}=l_{ij};]I_1 i=Ai;$$

$$[l_{2j}=l_{ij}-(l_{ij}+);]I_2 i=P-B+;$$

$$[l_{i}l_{j}=\min(l_{1j},l_{2j});]SD_i=\min I1_{ij}2_j;$$

$$[l_{i}l_{j}=\max(l_{1j},l_{2j});]LD_i=\max I1_{ij}2_j;$$

where, [ ] P is the period length of the ribbon pattern given by:

$$P=[F]_{n(M_n+1)}+[L]_{n(M_n+1)}+G+\delta_{Gn}$$

Figure 2:
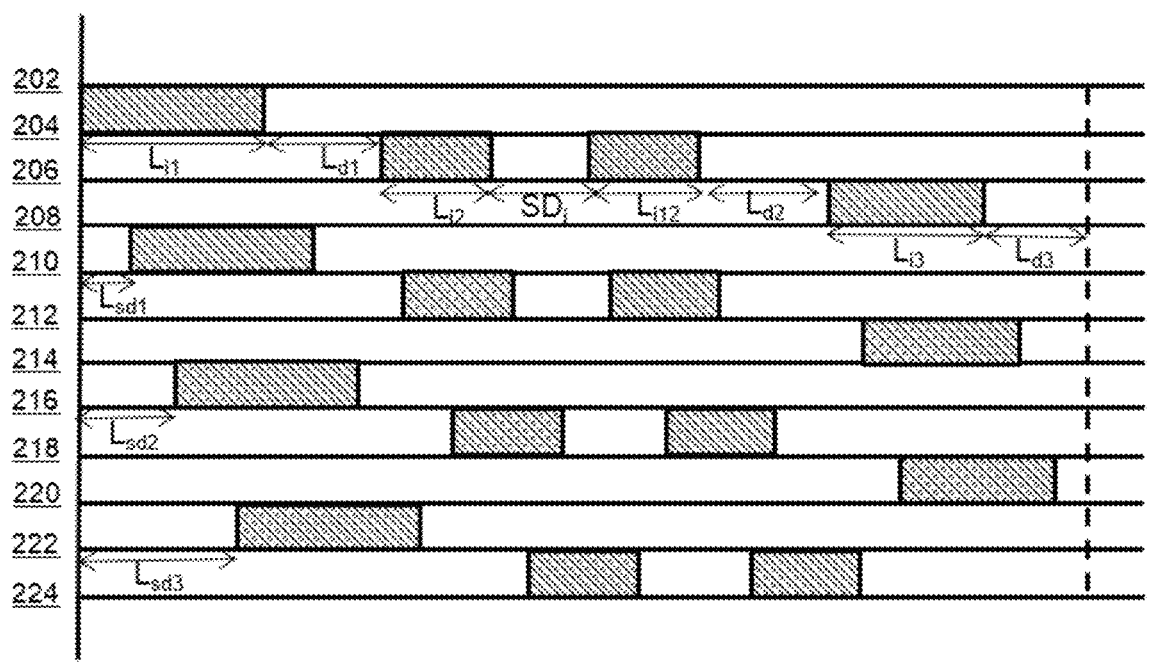
FIG. 2 illustrates an exemplary intermittently bonded optical fibre ribbon having a plurality of groups with a specific distance of shift in longitudinal direction.

According to FIG. 2, this is an exemplary intermittently bonded optical fibre ribbon 200 having the plurality of groups with each group offset by a specific distance ($L_{sdi}$) in the longitudinal direction with respect to each other. The exemplary intermittently bonded optical fibre ribbon 200 includes a plurality of optical fibres 202-224. In addition, the plurality of optical fibres 202-224 is segmented into the plurality of groups. Further, number of the plurality of groups of the plurality of optical fibres 202-224 in the exemplary intermittently bonded optical fibre ribbon 200 is 4 (202-208, 208-214, 214-220, 220-224). Furthermore, number of the plurality of groups of the plurality of optical fibres 202-224 in the exemplary intermittently bonded optical fibre ribbon 200 may vary. However, those skilled in the art would appreciate that the exemplary intermittently bonded optical fibre ribbon 200 may have more/less number of the plurality of groups. The intermittently bonded optical fibre ribbon 200 is a 12 fibre ribbon bonded by a plurality of bonds. The plurality of bonds is positioned in such a way as to form four groups of optical fibres. The bonding pattern repeats in each of the four groups of optical fibres. The plurality of groups of the plurality of optical fibres 202-224 in the exemplary intermittently bonded optical fibre ribbon 200 includes a first group, a second group, a third group, and a fourth group.

The first group of the plurality of groups includes a first fibre 202, a second fibre 204, a third fibre 206, and a fourth fibre 208. In addition, the second group of the plurality of groups includes the fourth fibre 208, a fifth fibre 210, a sixth fibre 212, and a seventh fibre 214. Further, the third group of the plurality of groups includes the seventh fibre 214, an eighth fibre 216, a ninth fibre 218 and a tenth fibre 220. Furthermore, the fourth group of the plurality of groups includes the tenth fibre 220, an eleventh fibre 222, and a twelfth fibre 224 (as shown in the FIG. 2). The grouping shown in FIG. 2 is for example purposes and there may be lesser or more number of groups of optical fibres and total number of optical fibres may be more or less than 12.

The plurality of bonds is placed in the repeatable bonding pattern with the specific distance of shift in longitudinal direction of each of the plurality of groups of the plurality of optical fibres 202-224. In addition, the bonded length $L_f$ and the un-bonded length vary along the predefined length of the adjacent optical fibres of the plurality of optical fibres 202-224. The predefined length corresponds to the repeatable bonding pattern. The repeatable bonding pattern repeats along the adjacent optical fibres of the plurality of optical fibres 202-224. Furthermore, the repeatable bonding pattern in different groups of the plurality of groups shifts with the specific distance in longitudinal direction of the exemplary intermittently bonded optical fibre ribbon 200.

In addition, the first fibre 202 and the second fibre 204 of the first group may be bonded with a first set of bonded portion from the plurality of bonded portions. The first set of bonded portion is a first bond between the first fibre 202 and the second fibre 204. Further, bonded length $L_{i1}$ of the first set of bonded portion from the plurality of bonded portions between the first fibre 202 and the second fibre 204 is about 12 millimeters. Furthermore, the bonded length $L_{i1}$ of the first set of bonded portion from the plurality of bonded portions between the first fibre 202 and the second fibre 204 may vary.

In addition, the second fibre 204 and the third fibre 206 of the first group may be bonded with a second set of bonded portion from the plurality of bonded portions. The second set of bonded portion is a second bond between the second fibre 204 and the third fibre 206. Further, distance $L_{d1}$ between the second set of bonded portion and the first set of bonded portion of the first group is 9 millimeters. Furthermore, the distance $L_{d1}$ between the second set of bonded portion and the first set of bonded portion of the first group may vary. Moreover, number of the plurality of bonds in the second set of bonded portion is 2. Also, each of the plurality of bonds in the second set of bonded portion has bonded length $L_{i2}$ of about 6 millimeters. Also, the bonded length $L_{i2}$ of each of the plurality of bonds in the second set of bonded portion may vary. Also, each of the plurality of bonds in the second set of bonded portion has the shortest distance $SD_i$ of about 6 millimeters.

In addition, the third fibre 206 and the fourth fibre 208 of the first group may be bonded with a third set of bonded portion from the plurality of bonded portions. The third set of bonded portion is a third bond between the third fibre 206 and the fourth fibre 208. Further, bonded length $L_{i3}$ of the third set of bonded portion from the plurality of bonded portions between the third fibre 206 and the fourth fibre 208 is about 10 millimeters. Furthermore, the bonded length $L_{i3}$ of the third set of bonded portion from the plurality of bonded portions between the third fibre 206 and the fourth fibre 208 may vary. Moreover, distance $L_{d2}$ between the third set of bonded portion and the second set of bonded portion of the first group is 9 millimeters. Also, the distance $L_{d2}$ between the third set of bonded portion and the second set of bonded portion of the first group may vary. Also, distance $L_{d3}$ between the third set of bonded portion and end of the exemplary intermittently bonded optical fibre ribbon 200 varies in range of 6 millimeters to 12 millimeters. The bonding pattern is repeated after the distance $L_{d3}$ along a horizontal direction of the intermittently bonded optical fibre ribbon 200.

In addition, specific distance $L_{sd1}$ of shift in longitudinal direction of the second group from the first group to form the repeatable bonding pattern is 3 millimeters. The specific distance $L_{sd1}$ may be in a range of 0 millimetre to 20 millimetres. Further, the specific distance $L_{sd1}$ of shift in longitudinal direction of the second group from the first group to form the repeatable bonding pattern may vary. Furthermore, specific distance $L_{sd2}$ of shift in longitudinal direction of the third group from the first group to form the repeatable bonding pattern is 6 millimeters. The specific distance $L_{sd1}$ may be in a range of 0 millimetre to 40 millimetres. Moreover, the specific distance $L_{sd2}$ of shift in longitudinal direction of the third group from the first group to form the repeatable bonding pattern may vary. Also, specific distance $L_{sd3}$ of shift in longitudinal direction of the fourth group from the first group to form the repeatable bonding pattern is 9 millimeters. The specific distance $L_{sd1}$ may be in a range of 0 millimetre to 60 millimetres. Also, the specific distance $L_{sd3}$ of shift in longitudinal direction of the fourth group from the first group to form the repeatable bonding pattern may vary. However, those skilled in the art would appreciate that shift in longitudinal direction of the plurality of groups in the exemplary optical fibre ribbon 200 may have more/less value of the specific distance. However, those skilled in the art would appreciate that the repeatable bonding pattern in the exemplary optical fibre ribbon 200 may vary according to number of the plurality of optical fibres 202-224.

Figure 3:
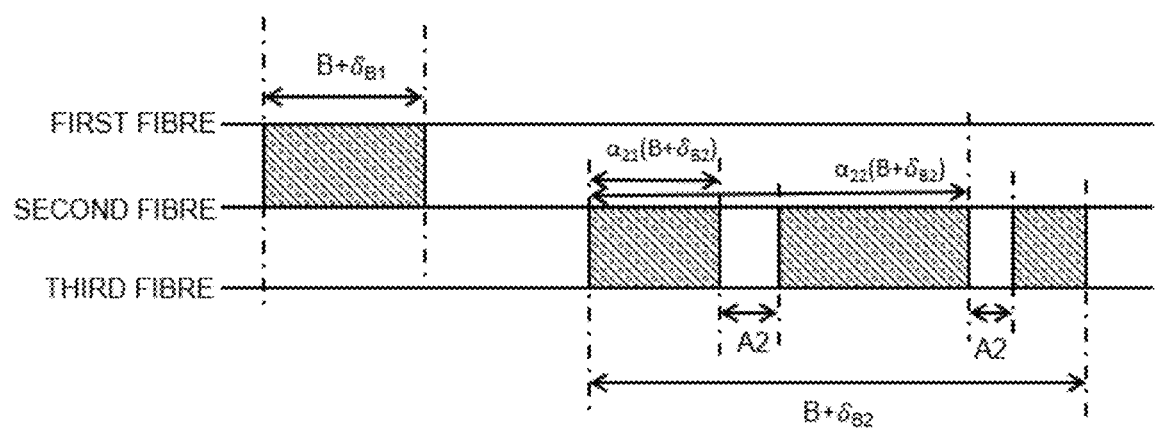
FIG. 3 illustrates mathematical derivations for the intermittently bonded optical fibre ribbon.

According to FIG. 3, these are mathematical derivations for the intermittently bonded optical fibre ribbon 100.

In an example, consider a function F (B, G, $\vec{\delta}_B$, $\vec{\delta}_G$, $\vec{A}$, $\alpha$). In addition, the function describes the coordinate of each bond of the plurality of bonds in one period length of a ribbon. Further, B in the function [ ] is the principal bonded length and G in the function [ ] is un-bonded length. Furthermore, $\vec{\delta}_B$ and $\vec{\delta}_G$ are vectors of size n whose [ ]$j^{th}$ element specifies change in bonded and un-bonded length between [ ]$j^{th}$ and ([ ]i+1)$^{th}$ fibres in the ribbon. Moreover, $\vec{A}$ is the vector of size n whose [ ]$j^{th}$ element specifies split size in the bond between [ ]$j^{th}$ and ([ ]j+1)$^{th}$ in the ribbon. Also, the split size ($\vec{A}$) in the bond between [ ]$j^{th}$ and ([ ]i+[ ]i)[ ]$^{th}$ fibres may vary by converting $\vec{A}$ into a matrix by specifying unequal values for the size of splits that occur between [ ]$j^{th}$ and (i+i$^{th}$) fibres. In another example, since the split bonds are weaker than un-splitted bonds of the same length (B+$\delta_{Bi}$), the split bond is alternated with un-splitted bond in next period. In addition, the alteration of the split bond with un-splitted bond results into splitted bond followed by unsplitted bond, in the next period, to ensure that the corresponding fibre pair is not weakly bonded.

Also, [ ] $\alpha$ is a n×K size matrix which specifies location of the split along the bond. Also, each element of [ ] $\alpha$ is a fraction (0≤ ≤1) and conveys at what fraction of the total bond length does the split lie. Also, if a fibre pair specified is less than K number of splits, then the subsequent columns of that row is 0.

$$\alpha = \begin{pmatrix} 0 & 0 & 0 \\ a_{21} & a_{22} & 0 \\ 1 & 1 & 1 \end{pmatrix}$$

K=3

$a_{21}$ is not zero if $a_{22}$ is non-zero.

In an example, consider a vector ($\vec{M}$) and two integers (n and N). In addition, n is stencil size (number of consecutive fibre pairs after which the pattern repeats in the ribbon). Further, N is total number of fibres in the ribbon, i.e. N−1 number of spaces for bonds. Furthermore, a is the vector which provides number of splits in each consecutive fibre pair. It can be calculated from [ ] $\alpha$ as → [ ]$\vec{M}i$=one less than the column number of first zero in the [ ]$i^{th}$ row of the [ ] $\alpha$ matrix; if the row has all non-zero elements then it is equal to K.

The Function is Defined as Follows $$\text{For}[\ ]i=1[\ \ \ ] \text{ to } n \& [\ ]J=1 \text{ to } \vec{M}i$$
$$[\ \ \ ]+1:[[\ ]\ \ ][F]i=([\ ]j-1)$$
$$([\ +\ ]B+G)+\Sigma_{k=1}^{i-1}[\ \ \ ]OGK+$$
$$\Sigma_{k=1}^{i-1}[\ \ \ ]aij([\ ]J-1)([\ ]B+oBi+[\ \ ]Ai)$$

where, $[\ \ \ (\ )]$ sgn(x)=1 (if $[\ ]$ x>0)
sgn(x)=0 (if $[\ ]$x=0)
sgn(x)=−1 (if $[\ ]$x<0)
For $[\ =1\ \ \ \ \& \ =\ _{+2}\ \ \ -1]$:i=1 to n & j=$M_{i+2}$ to N−1
$[F]_{ij}=[F]_{i(M_i+1)}$
For $[\ =\ +1\ \ \ -1 \& L=1\ \ \ -1]$:For i=$n_+1$ to N−1 & j=1 to N−1
$[F]_{ij}=[F]_{(i-n)j}$
Also, the bond length for the bond with coordinate $[[\ ]]$ |F| is given by L as:

$[[\text{If }\ \ =0]\text{If }Mi=0$ $[[\ ]\ _1=(\ +\ \ \ )][L]i1=(B+oBi)$ $[\text{If }\ \ \neq 0]\text{If }Mi\neq 0$ $[[\ ]\ _1=\ _1(\ +\ \ \ )]][L]i1=ai1(B+oBi)$ $[L]_{ij}=(\alpha_{ij}-\alpha_{i(j-1)})(B+\delta_{Bi})-A_i(\text{for }M_i\geq j\geq 2)[L]_{i(M_i+1)}=(1-\alpha_{iM_i})(B+\delta_{Bi})-A_i$ Interpretation of function F:
Each row of the resulting matrix consists of coordinates of bonds between consecutive fibre pairs in one period length and output has N−1 rows. (N is the number of fibres in ribbon). In addition, each consecutive fibre pair includes multiple bonds. Further, multiple bonds are achieved by adding multiple splits in the bond of size $[\ +\ \ \ ]$ through the function. Furthermore, the split size between consecutive pairs is input to the function through the vector $\vec{A}$. Moreover, split locations are input to the function through the matrix $[\ ]$. Also, split size ($\vec{A}$) in the bond between $[\ \ \ $ and $(\ +\ )$ fibres] may vary. Also, $\vec{A}$ can be converted to the matrix to specify unequal values for size of splits [that occur between $\ \ \ $ and $(\ +\ )$ fibres]. Also, the first column in the particular row of that matrix is the location of the first split. Also, the second column is the location of the second split, and the like. Also, number of rows in $\vec{A}$ [and $\ $] is n (because the pattern will repeat in subsequent consecutive pairs[, so there is no need for having $\ −1$ rows)] and
number of columns corresponds to the [in $\ $ is $\ $ (which is the] maximum number of splits required among all consecutive pairs[)]. [Also, rows with splits less than $\ $, subsequent columns of the matrix contained is 0]. Also, output of the function describes the location of each bond. Also, the output matrix of the function is of size (N−1)×(K+1). Also, the number of columns is (K+1) because the maximum number of bonds is one more than the maximum number of splits. In an example, consider the bond coordinates between 3rd and 4th fibre in the ribbon. In addition, 3rd row of the output matrix is read. Further, first column specifies location of first bond and corresponding length is provided by element located at same position in the matrix L. Furthermore, second column specifies location of second bond and corresponding length is provided by element located at same position in the matrix L. Moreover, last bond in fibre pair is denoted by $[\ ]X_3+1$. $[\ ]X_3$ [and] contains number of splits in fibre pair based on non-zero columns in the matrix $[\ ]$ specified by the user.

Figure 4:
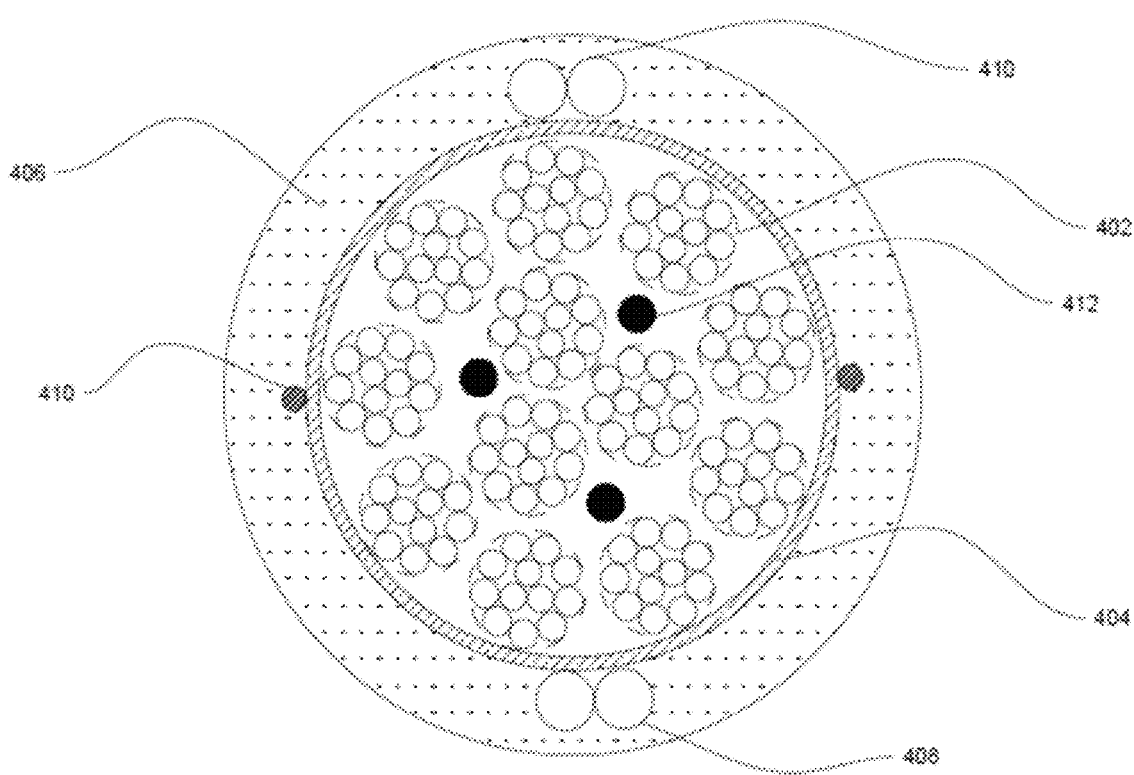
FIG. 4 illustrates an example of an optical fibre cable.

According to FIG. 4, this is an example of an optical fibre cable 400. The optical fibre cable 400 includes a plurality of bundles 402, a water blocking tape 404, a sheath 406, a plurality of strength members 408, a plurality of ripcords 410, and a plurality of water swellable yarns 412.

In addition, each bundle of the plurality of bundles 402 includes the plurality of intermittently bonded optical fibre ribbons. Each of the plurality of intermittently bonded optical fibre ribbons is the intermittently bonded optical fibre ribbon 100 of FIG. 1. The plurality of intermittently bonded optical fibre ribbons is bundled together using binders. Further, the number of the plurality of bundles 402 in the optical fibre cable 400 is 12. Furthermore, the number of the plurality of bundles 402 in the optical fibre cable 400 is 24. Moreover, number of the plurality of bundles 402 may vary. Also, number of the plurality of intermittently bonded optical fibre ribbons in each bundle of the plurality of bundles 402 is 12. Also, number of the plurality of intermittently bonded optical fibre ribbons in each bundle of the plurality of bundles 402 is 24. Also, number of the plurality of intermittently bonded optical fibre ribbons of each bundle of the plurality of bundles 402 may vary.

The plurality of intermittently bonded optical fibre ribbons includes the plurality of optical fibres. In addition, each of the plurality of intermittently bonded optical fibre ribbons includes 12 optical fibres of the plurality of optical fibres. Further, number of optical fibres of the plurality of optical fibres may vary. Furthermore, number of the plurality optical fibres inside the optical fibre cable 400 is 1728 (corresponding to 12 bundles and each bundle having 12 ribbons). Moreover, number of the plurality optical fibres inside the optical fibre cable 400 is 6912 (corresponding to 24 bundles and each bundle having 12 ribbons). Also, number of the plurality of optical fibres inside the optical fibre cable 400 may vary.

The optical fibre cable 400 includes the water blocking tape 404. The water blocking tape 404 surrounds the plurality of bundles 402. In general, water blocking tapes provides water resistance to optical fibre cables over long period of time. The water blocking tape 404 facilitates complete insulation and protects the optical fibre cable 400 against water ingression. Further, the optical fibre cable 400 includes the sheath 406. The sheath 406 is an outer most layer of the optical fibre cable 400. The sheath 406 provides protection to the optical fibre cable 400 from environmental conditions. The environmental conditions includes but may not be limited to rainfall, snowfall, wind, and sunlight.

The optical fibre cable 400 includes the plurality of strength members 408. The plurality of strength members is embedded inside the sheath 406 of the optical fibre cable 400. In addition, each strength member of the plurality of strength members 408 provides tensile strength to the optical fibre cable 400. Further, the optical fibre cable 400 includes the plurality of ripcords 410. In general, ripcords are used for stripping of sheath of optical fibre cable. The plurality of ripcords 410 facilitates access to the plurality of optical fibres. The plurality of ripcords 410 lies diametrically opposite to each other. Further, each of the plurality of ripcords 410 has circular shape. The plurality of ripcords 410 may have any suitable shape. Furthermore, number of the plurality of ripcords 410 inside the optical fibre cable 400 is two. Moreover, number of the plurality of ripcords 410 inside the optical fibre cable 400 may vary.

The optical fibre cable 400 includes the plurality of water swellable yarns 412. The plurality of water swellable yarns 412 is positioned along the plurality of bundles 402. The plurality of water swellable yarns 412 prevents ingression of water in the optical fibre cable 400. In addition, the plurality of water swellable yarns 412 is used to absorb moisture inside the optical fibre cable 400.

Figure 5:
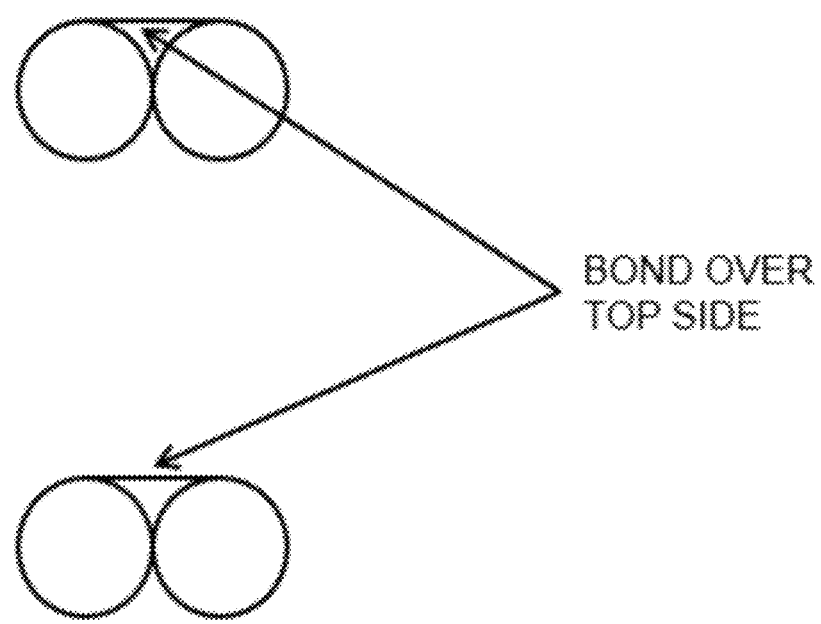
FIG. 5 illustrates an example of bonding of adjacent fibres.

As shown in FIG. 5, this is an example 500 of bonding of adjacent fibres. In the example 500, the adjacent fibres are a segment of the intermittently bonded optical fibre ribbon 100. In addition, the adjacent fibres of the intermittently bonded optical fibre ribbon 100 are bonded with the plurality of bonds. Further, the plurality of bonds is made of matrix material. In the example 500, the plurality of bonds used to bind the adjacent fibres of the intermittently bonded optical fibre ribbon 100 has flat shape. Furthermore, the plurality of bonds having flat shape may be applied only over top side of the adjacent fibres of the intermittently bonded optical fibre ribbon 100 in the example 500.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An intermittently bonded optical fibre ribbon comprising:
a plurality of optical fibres such that adjacent optical fibres of the plurality of optical fibres are bonded intermittently along a length by a plurality of bonded portions spaced apart by a plurality of un-bonded portions, wherein the plurality of bonded portions is defined by a bonded length $L_i$ and the plurality of un-bonded portions is defined by an un-bonded length, wherein at least one of the bonded length $L_i$ and the un-bonded length varies along a predefined length of the adjacent optical fibres of the plurality of optical fibres, wherein the predefined length in different groups of plurality of groups shifts with a specific distance in longitudinal direction of the intermittently bonded optical fibre ribbon.

2. The intermittently bonded optical fibre ribbon as claimed in claim 1, wherein the bonded length $L_i$ varies in a range of 2 millimeters to 40 millimeters.

3. The intermittently bonded optical fibre ribbon as claimed in claim 1, wherein the un-bonded length has a shortest distance $SD_i$, within the predefined length, wherein the shortest distance $SD_i$, varies in a range of 2 millimeters to 25 millimeters.

4. The intermittently bonded optical fibre ribbon as claimed in claim 1, wherein the un-bonded length has a longest distance $LD_i$ within the predefined length, wherein the longest distance La varies in a range of 5 millimeters to 180 millimeters.

5. The intermittently bonded optical fibre ribbon as claimed in claim 1, wherein the predefined length corresponds to a repeatable bonding pattern, wherein the repeatable bonding pattern repeats along the adjacent optical fibres of the plurality of optical fibres.

6. The intermittently bonded optical fibre ribbon as claimed in claim 1, wherein the plurality of optical fibres has a diameter in a range of 160 micrometers to 250 micrometers.

7. The intermittently bonded optical fibre ribbon as claimed in claim 1, wherein the plurality of optical fibres has a pitch in a range of 160 micrometers to 250 micrometers.

8. The intermittently bonded optical fibre ribbon as claimed in claim 1, wherein the bonded length $L_i$ and the un-bonded length between consecutive fibre pairs of the plurality of optical fibres are different and form a repeatable bonding pattern.

9. An intermittently bonded optical fibre ribbon comprising:
a plurality of optical fibres such that adjacent optical fibres of the plurality of optical fibres are bonded intermittently along a length by a plurality of bonded portions spaced apart by a plurality of un-bonded portions, wherein the plurality of bonded portions is defined by a bonded length $L_i$ and the plurality of un-bonded portions is defined by an un-bonded length, wherein the bonded length $L_i$ and the un-bonded length between consecutive fibre pairs of the plurality of optical fibres are different and form a repeatable bonding pattern.

10. The intermittently bonded optical fibre ribbon as claimed in claim 9, wherein the bonded length $L_i$ varies in a range of 2 millimeters to 40 millimeters.

11. The intermittently bonded optical fibre ribbon as claimed in claim 9, wherein the un-bonded length has a shortest distance $SD_i$, within the predefined length, wherein the shortest distance $SD_i$, varies in a range of 2 millimeters to 25 millimeters.

12. The intermittently bonded optical fibre ribbon as claimed in claim 9, wherein the un-bonded length has a longest distance La within the predefined length, wherein the longest distance $LD_i$ varies in a range of 5 millimeters to 180 millimeters.

13. The intermittently bonded optical fibre ribbon as claimed in claim 9, wherein the predefined length corresponds to a repeatable bonding pattern, wherein the repeatable bonding pattern repeats along the adjacent optical fibres of the plurality of optical fibres.

14. The intermittently bonded optical fibre ribbon as claimed in claim 9, wherein the predefined length in different groups of the plurality of groups shifts with a specific distance in longitudinal direction of the intermittently bonded optical fibre ribbon.

15. The intermittently bonded optical fibre ribbon as claimed in claim 9, wherein the plurality of optical fibres has a pitch in a range of 160 micrometers to 250 micrometers.

16. The intermittently bonded optical fibre ribbon as claimed in claim 9, wherein at least one of the bonded length $L_i$ and the un-bonded length varies along a predefined length of the adjacent optical fibres of the plurality of optical fibres.

* * * * *